V. J. DA ROCHA.
CLAMP.
APPLICATION FILED JAN. 20, 1916.
1,245,880.
Patented Nov. 6, 1917.
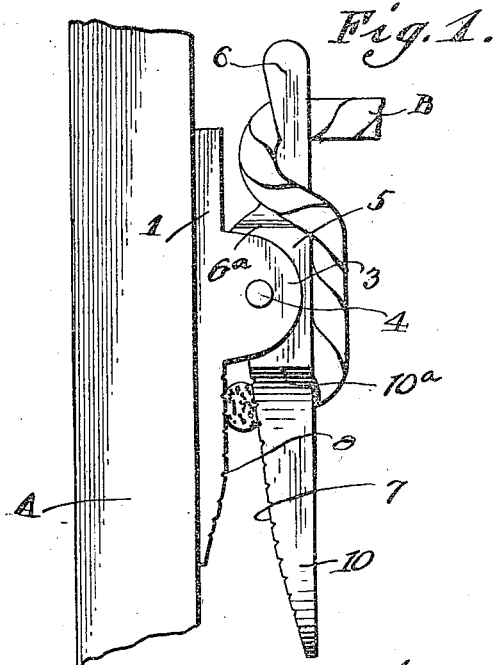
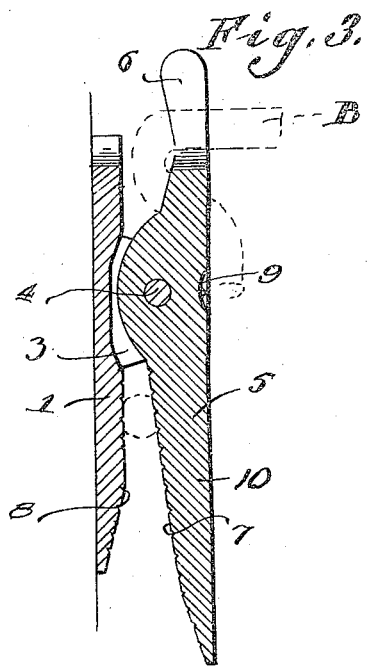
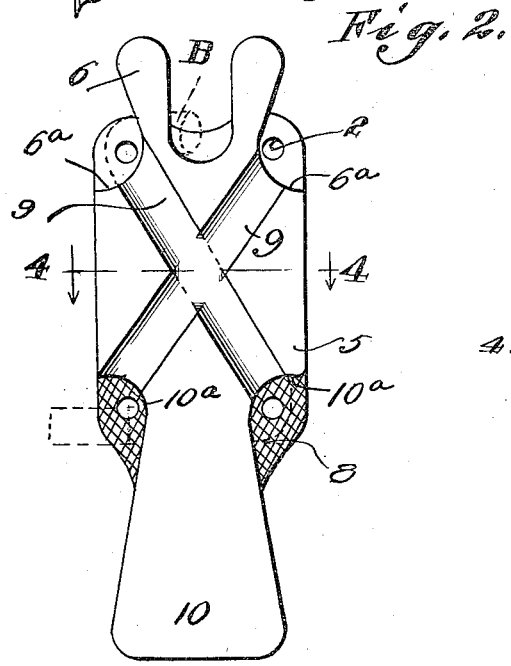
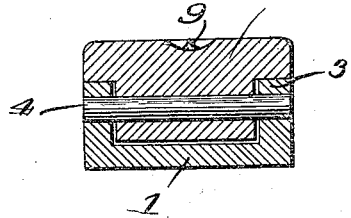
WITNESSES
INVENTOR
Verginio J. da Rocha,
BY
ATTORNEY

UNITED STATES PATENT OFFICE.

VERGINIO J. DA ROCHA, OF BRISTOL, RHODE ISLAND.

CLAMP.

1,245,880.   Specification of Letters Patent.   Patented Nov. 6, 1917.

Application filed January 20, 1916. Serial No. 73,234.

*To all whom it may concern:*

Be it known that I, VERGINIO J. DA ROCHA, a citizen of the United States, residing at Bristol, in the county of Bristol and State of Rhode Island, have invented certain new and useful Improvements in Clamps, of which the following is a specification.

This invention relates to clamps and more particularly to a clamp for securing lines such as a rope or the like.

The principal object of the invention is to provide a clamp of this character which will serve to secure a line to a relatively fixed support without the necessity of knotting the line.

Another object of the invention is to provide a clamp of this character in which a line may be secured with slight effort and in a minimum of time.

Another object of the invention is to provide a clamp for a line or the like which may be freely pulled in one direction relative to the clamp to tighten the line, and which will, upon release of the line serve to grip the same and prevent its movement in the opposite direction.

A further object of the invention is to provide a clamp of this character which is extremely simple in construction, cheap and easy to manufacture, and which is thoroughly reliable and efficient in operation.

With the foregoing and other objects in view, the invention consists in the novel features of construction, combination and arrangement of parts as will be hereinafter, more fully described, illustrated in the accompanying drawings, and claimed.

In the drawings:

Figure 1 is a side elevation of the clamp showing the same applied to a post and a rope clamped therein.

Fig. 2 is a front elevation.

Fig. 3 is a central vertical sectional view therethrough; and

Fig. 4 is a transverse section on the line 4—4 of Fig. 2.

Referring to the drawings by numerals, wherein is illustrated the preferred embodiment of my invention, 1 designates the base plate of the clamp which is preferably constructed of metal and which is of substantially rectangular shape. This plate is provided with openings 2 through which screws or other suitable fastening elements may be passed to secure the plate to an object, indicated at A. This plate intermediate its ends is provided upon the opposite edges thereof with outstanding alined lugs 3 which are provided with openings to receive a pintle 4 upon which is mounted for pivotal movement a clamp member 5.

The clamp member 5 comprises a body portion of substantially the same width as the base plate. This body portion is recessed intermediate its ends upon its opposite edges to receive the lugs 3 of the base plate, an enlargement being formed upon the under face thereof and having an opening extending therethrough to receive the pintle 4.

The clamp member 5 upon one of its ends is provided with spaced outstanding arms 6, on the outer side of each of which is a concave shoulder 6$^a$. At its opposite end, that is to the other side of the pintle 4, this clamp member is of reduced width to form a tongue 10, at each side of which is a concave shoulder 10$^a$. The rear or under face of the tongue is flared or curved away from the base plate 1 toward its lower end and roughened or knurled as indicated at 7, as is also the adjacent outer face of the base plate 1, as indicated at 8.

The arms 6 are arranged within the outer edges of the clamp member, the outer face of which is provided with a pair of diagonal grooves 9, crossing at the center of the clamp and which extend each from a shoulder 6$^a$ on one side to a shoulder 10$^a$ at the opposite side. The outwardly flaring lower ends of the base plate and clamp member coöperate to form a securing means for a rope which they grip more tightly as the tension on the rope is increased.

The line, shown in the present instance, as a rope B, to be secured by the clamp, is first passed between the arms 6 and then inwardly and around one of the arms, after which it is brought up and over the adjacent shoulder 6$^a$ and along the diagonal groove 9 extending from said shoulder to the opposite shoulder 10$^a$, thence under the tongue 10 of the clamp member and drawn in toward the pintle 4 between the clamp member and the base plate. By pulling upon this end of the line, the same will be permitted to slide freely between the base plate and clamp member and over the clamp member and between the arms to tighten the line, but as soon as the end of the line is released, the tension of the line will tend to swing the upper end of the clamp member outwardly upon its pivot point and throw its lower end inwardly to clamp the rope against the base plate, the roughened faces of the adjacent clamping faces of the base plate and clamp member serving to prevent sliding movement of the end of the rope in its clamped position. It will thus be seen that the greater the pull upon the rope the greater will be the clamping action of the clamp member against its free end.

If desired more than a single rope may be passed between the arms 6 and extended diagonally over the clamp plate in opposite directions and brought between the clamp faces of the plate and clamp member, as will be understood.

From the above description it will be apparent that I have provided a clamp which will secure one end of a line to an object without necessitating knotting of the line in any manner. It will also be seen that the line may be secured efficiently in a minimum of time.

From the foregoing description taken in connection with the accompanying drawings, it is thought that the construction and operation of my improved clamp will be readily understood and while I have herein shown and described one preferred embodiment of my invention, I do not wish to be limited thereto except for such limitations as the claims may import.

I claim:

1. A clamp comprising a base plate, a clamp member pivotally connected to said base plate intermediate its ends and having a tongue at one end and a pair of outstanding arms upon the opposite end the facing or co-acting sides of said base plate and tongue being beveled from each other toward their free ends and roughened.

2. A clamp comprising a base plate, a clamp member pivotally mounted upon said base plate having a tongue projecting from one end and a pair of arms on its opposite end, a shoulder being formed on the outside of each arm and each side of said tongue, and diagonally extending grooves extending between opposite shoulders, the opposing faces of said base plate and tongue being roughened and beveled away from each other toward the free ends of the same.

3. A clamp comprising a base plate having lugs formed at the side edges thereof intermediate its ends, and a roughened flaring outer face on one end of said plate, a clamping member arranged between said lugs, a pintle extending through said lugs and said clamping member, arms carried upon one end of said clamping member, each arm having a shoulder on its outer side at its junction with said member, a tongue on the opposite end of the clamping member having a shoulder on each side, the inner face of the clamping member being roughened and beveled, and crossing grooves on the outer face of said clamping member joining diagonally opposite shoulders.

In testimony whereof I affix my signature in presence of two witnesses.

VERGINIO J. DA ROCHA.

Witnesses:
SAML WESLEY IRWIN,
MARGUERITE WARDWELL DE ROCHA.

Copies of this patent may be obtained for five cents each, by addressing the "Commissioner of Patents, Washington, D. C."